United States Patent
Radmanic (10) Patent No.: US 6,619,732 B2
(45) Date of Patent: Sep. 16, 2003

(54) MOTOR VEHICLE ROOF

(75) Inventor: Stjepan Radmanic, Mammendorf (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/042,290

(22) Filed: Jan. 11, 2002

(65) Prior Publication Data

US 2002/0113467 A1 Aug. 22, 2002

(30) Foreign Application Priority Data

Jan. 11, 2001 (DE) .......................................... 101 17 322

(51) Int. Cl.⁷ ................................................ B60J 7/047
(52) U.S. Cl. ................... 296/216.03; 296/223; 296/224
(58) Field of Search ............................ 296/216.03, 223, 296/224

(56) References Cited

U.S. PATENT DOCUMENTS

| 4,403,805 A | * 9/1983 | Strem, Jr. ............... 296/221 X |
| 5,358,303 A | 10/1994 | Huyer |
| 5,405,185 A | * 4/1995 | Cheron et al. ............... 296/223 |
| 6,158,803 A | * 12/2000 | Reihl et al. ............. 296/223 X |

FOREIGN PATENT DOCUMENTS

| DE | 42 38 945 C1 | 11/1993 |
| DE | 94 10 631 U1 | 12/1995 |
| DE | 197 13 348 C1 | 7/1998 |
| EP | 0 403 388 A | 12/1990 |
| JP | 169324 | * 6/1990 ................. 296/223 |

* cited by examiner

*Primary Examiner*—Dennis H. Pedder
(74) *Attorney, Agent, or Firm*—Nixon Peabody LLP; David S. Safran (57) ABSTRACT

The invention relates to a motor vehicle roof having at least one cover that can be moved and raised on its rear edge via with a control mechanism. The control mechanism has a rear lifting and displacement mechanism that is coupled near the rear edge of the cover to said mechanism. The control mechanism also comprises at least one control carriage that is connected to the cover, which can be driven and movably guided in lateral guide rails. To increase protection against ejection of the cover, the movable part of the lifting and displacement mechanism and the part that is connected to the cover have locking elements. The locking elements act in the closed position of the cover to prevent the upward ejection of the cover.

16 Claims, 13 Drawing Sheets

MOTOR VEHICLE ROOF

BACKGROUND OF THE INVENTION

1. Field of Invention

This invention relates generally to motor vehicle roofs. Specifically, the invention relates to motor vehicle roofs with a cover(s) that is movable and raisable via a control mechanism.

2. Description of Related Art

The present invention relates to a motor vehicle roof with at least one cover that can be moved and raised on its rear edge. The cover is moved and raised using a control mechanism that has a rear lifting and displacement mechanism. The control mechanism is coupled near the rear edge of the cover. The control mechanism also comprises at least one control carriage that is connected to the cover. The control carriage can be driven and movably guided in the lateral guide rails.

German patent No. 42 38 945 C1 discloses a motor vehicle roof with at least one cover, which can be raised for opening by means of a raising lever on its rear edge. The cover(s) can then be moved above the fixed motor vehicle roof. The displacement motion takes place by means of a first drive cable. The raising motion takes place by means of a second drive cable that can be moved opposite the first drive cable. A raising lever which controls the raising motion via the rear carriage permanently engages one drive cable, while the carriage which is located near the front edge and which is responsible for the displacement motion of the cover is permanently engaged to the other drive cable which can be moved opposite it. This permanent coupling only conditionally enables complete separation of the raising motion from the displacement motion and only a relatively short path of motion of the drive cable is available for the raising motion.

The disadvantages of the above explained known motor vehicle roof are eliminated by a motor vehicle roof of the initially mentioned type which is disclosed in German patent No. 197 13 348 C1. In particular, this motor vehicle roof ensures a clearly defined position of the cover during the raising motion by locking the control carriage, which effects the adjustment motion of the cover during the raising motion via a locking block with a roof-mounted guide rail. Decoupling from the guide rail and simultaneously coupling to the control carriage define a clear beginning of the displacement motion, since the first drive cable after completion of the idle path with completed raising motion moves the locking block out of its locking position with the guide rail into the coupling position of the drive cable with the control carriage.

A disadvantage in known motor vehicle roofs is that the cover is kept in the closed position only via the raising lever and a carriage that can be moved in the guide rail. In case of an accident wherein the airbag or a passenger's head impacts the inside of the cover, or other unfavorable circumstances, ejection forces act on the cover. Therefore, this coupling can no longer safely accommodate covers. In such circumstances, the cover coupling tends to unscrew itself from the slip element on the raising lever.

SUMMARY OF THE INVENTION

The object of the invention is to devise a motor vehicle roof of the initially mentioned type, with a rear adjustment and lifting mechanism that has increased crash safety.

This object is achieved in a generic motor vehicle roof by the movable part of the lifting and displacement mechanism and the part which is connected to the cover having locking elements which act in the closed position of the cover and which counteract ejection of the cover to the top. Advantageous developments of the invention are given in the dependent claims.

The locking elements ensure that the cover in the closed position is securely locked to the guide rail on the fixed motor vehicle roof via the lifting and displacement mechanism so that, even with strong pressure against the inside, the cover cannot be pressed upwardly out of the roof opening.

The movable part of the lifting and displacement mechanism is preferably formed by a raising lever. The part that is connected to the cover is preferably formed by a cover guide which engages part of the lifting and displacement mechanism and enables relative motion thereof relative to the cover upon raising. This relative motion enables simple end coupling of the locking elements.

The invention can be used especially and preferably on one such motor vehicle roof in which the cover can be moved to the rear above the fixed motor vehicle.

BRIEF DESCRIPTION OF THE DRAWINGS

The invention is detailed by way of example below using the drawings.

DETAILED DESCRIPTION OF THE INVENTION

Figure 1:
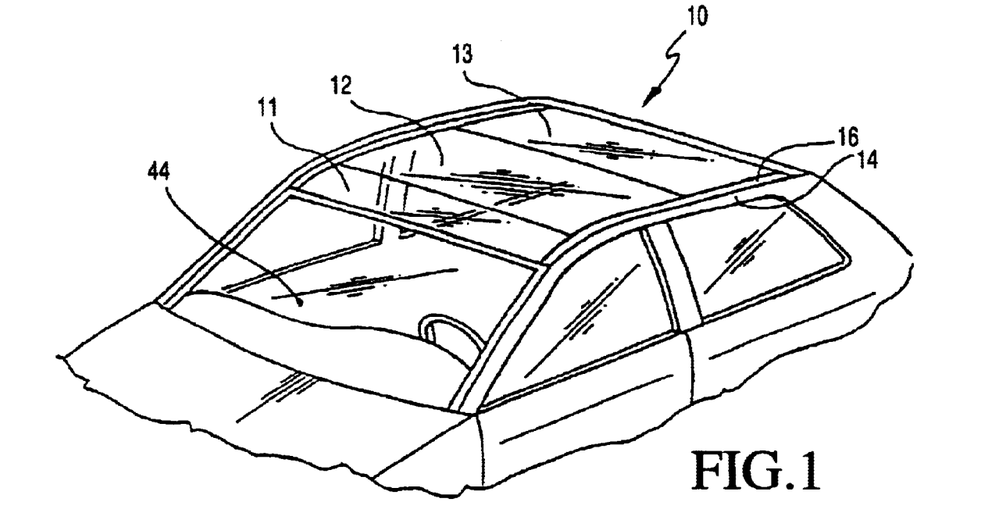
FIG. 1 shows a schematic perspective of a motor vehicle roof with the cover closed.

In accordance with the present invention, provided is a motor vehicle roof 10 comprising a wind deflector louver 11 that is pivotally located above the windshield 44, a movable cover 12 which is located behind this wind deflector louver 11, and a fixed roof pane 13 which adjoins the closed cover 12, as shown in FIG. 1. The wind deflector louver 11, the cover 12 and the roof pane 13 are each laterally bounded by a side member 14.

Figure 2:
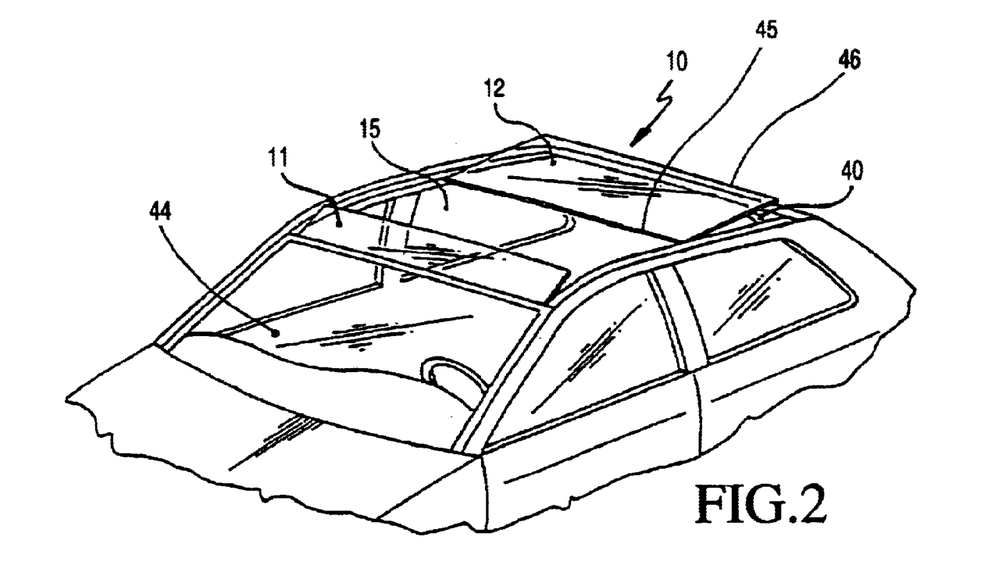
FIG. 2 shows a view as shown in FIG. 1 with the cover completely opened.

In the closed position, as shown in FIG. 1, the motor vehicle roof 10 offers a completely smooth appearance. Although the cover 12 can be moved to the rear over the fixed motor vehicle roof 10 to clear the roof opening 15, as shown in FIG. 2, no guides located above the fixed motor vehicle roof 10 are needed. In the raised position, wherein the cover 12 is moved to the rear, the cover 12 is supported rather by means of a support lever 40 which is coupled laterally in the area of the rear edge 46 of the cover 12, which can be moved in guides located underneath the level of the fixed roof skin, and which upon emergence partially displace to the top a flexible sealing element 16 which is located between the side members 14 and the components 11, 12, and 13.

The mechanism necessary for raising and moving the cover 12 has an identical structure on the left and the right side of the cover 12 so that only the mechanism of one side is described, as shown in FIGS. 3 to 9, and explained below.

The raising and displacement mechanism for the cover 12 comprises a guide rail 17 which is formed as a profile part with guideways which run in the lengthwise direction. In the lower guideway 20 the front control carriage 18 and the rear control carriage 19 are guided to move lengthwise. The two control carriages 18 and 19 are securely joined to the drive cable 21 with a mutual distance to one another. The control carriages 18 and 19 are moreover connected to the front edge 45 and the rear edge 46 of the cover 12, via one crank guide or support lever at a time for raising and supporting the front edge 45 and the rear edge 46 of the cover 12 when it is adjusted between its closed and open position, as is detailed below first for the front edge 45 and then for the rear edge 46 of the cover 12.

Figure 3:
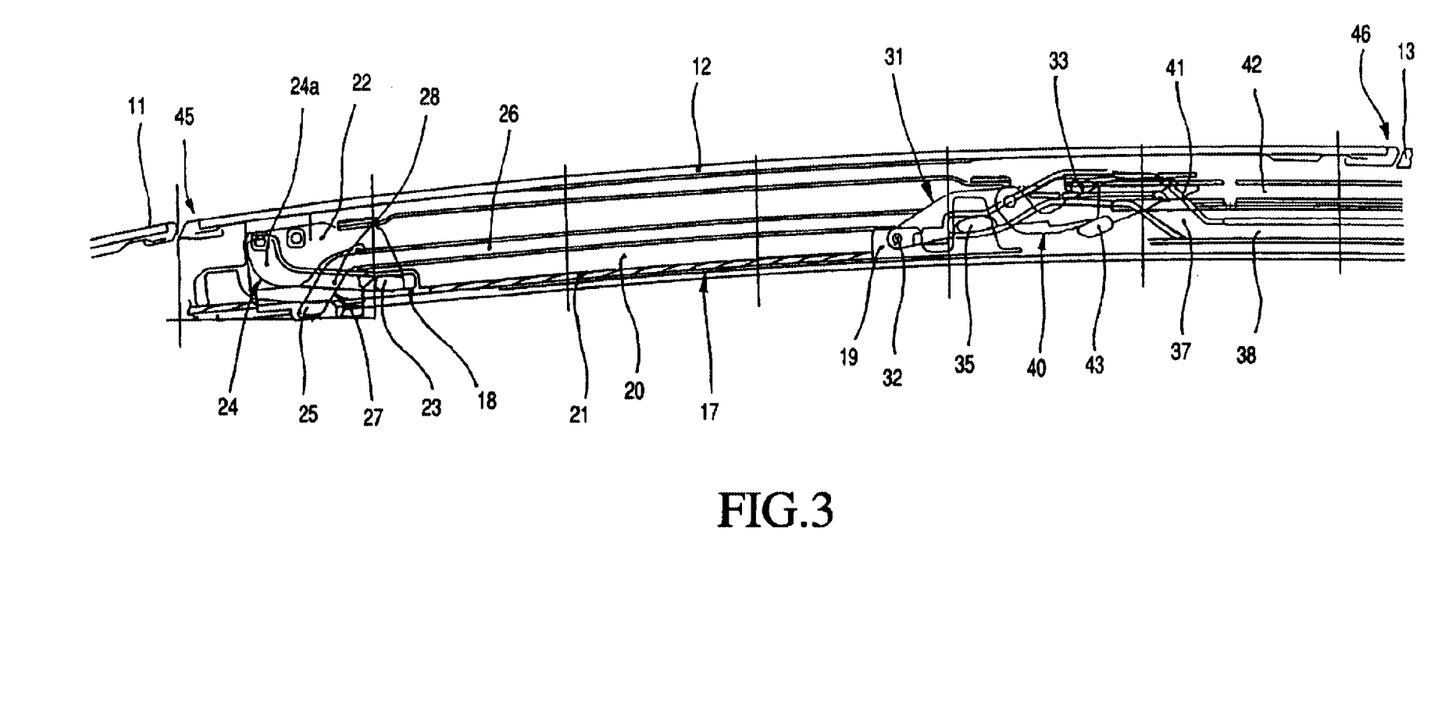
FIG. 3 shows a lengthwise section through one side edge of the motor vehicle roof in the area of the raising mechanism with the cover closed.
Figure 4:
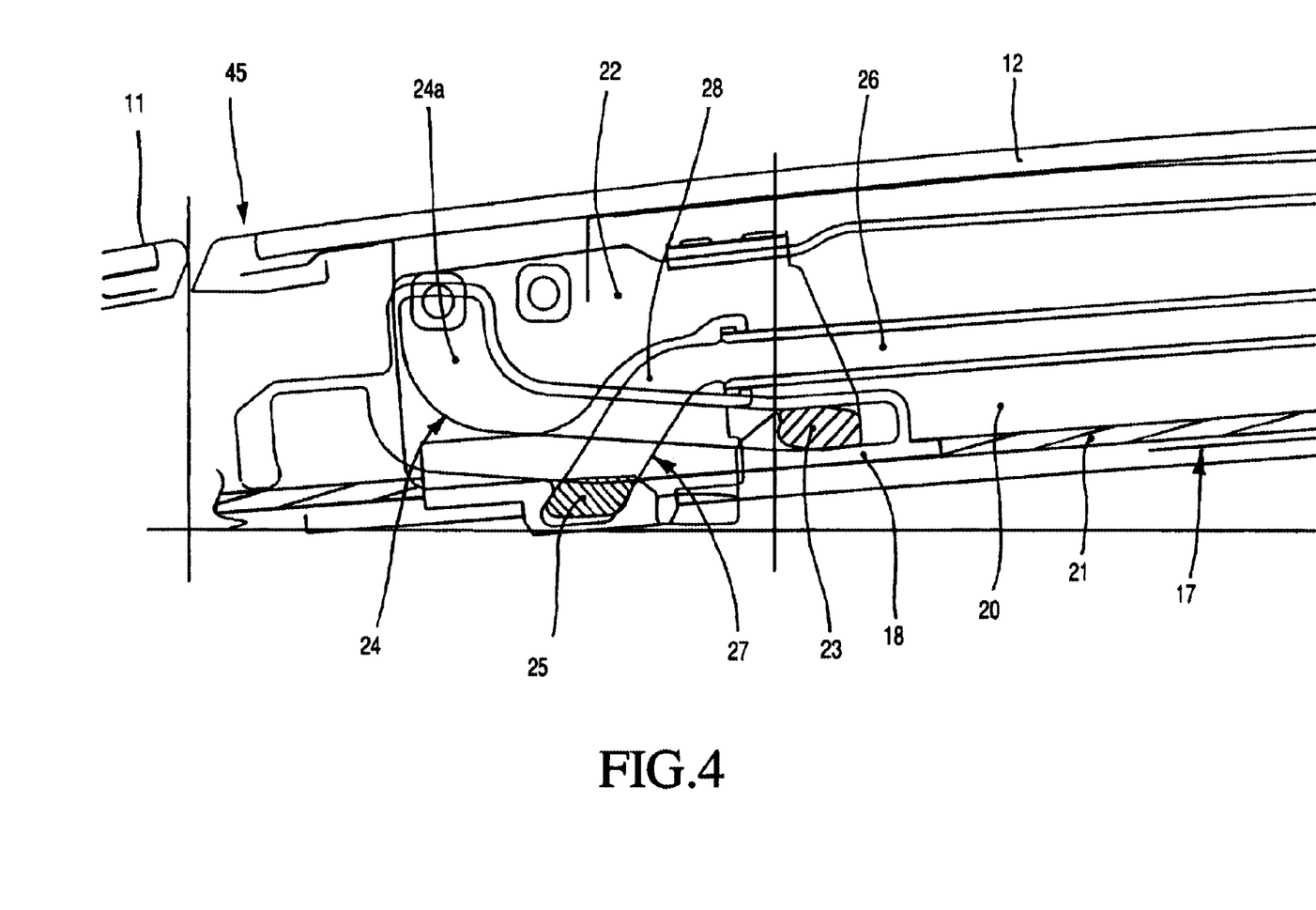
FIG. 4 shows a lengthwise section as shown in FIG. 3 through the front raising mechanism in an enlarged representation.
Figure 7:
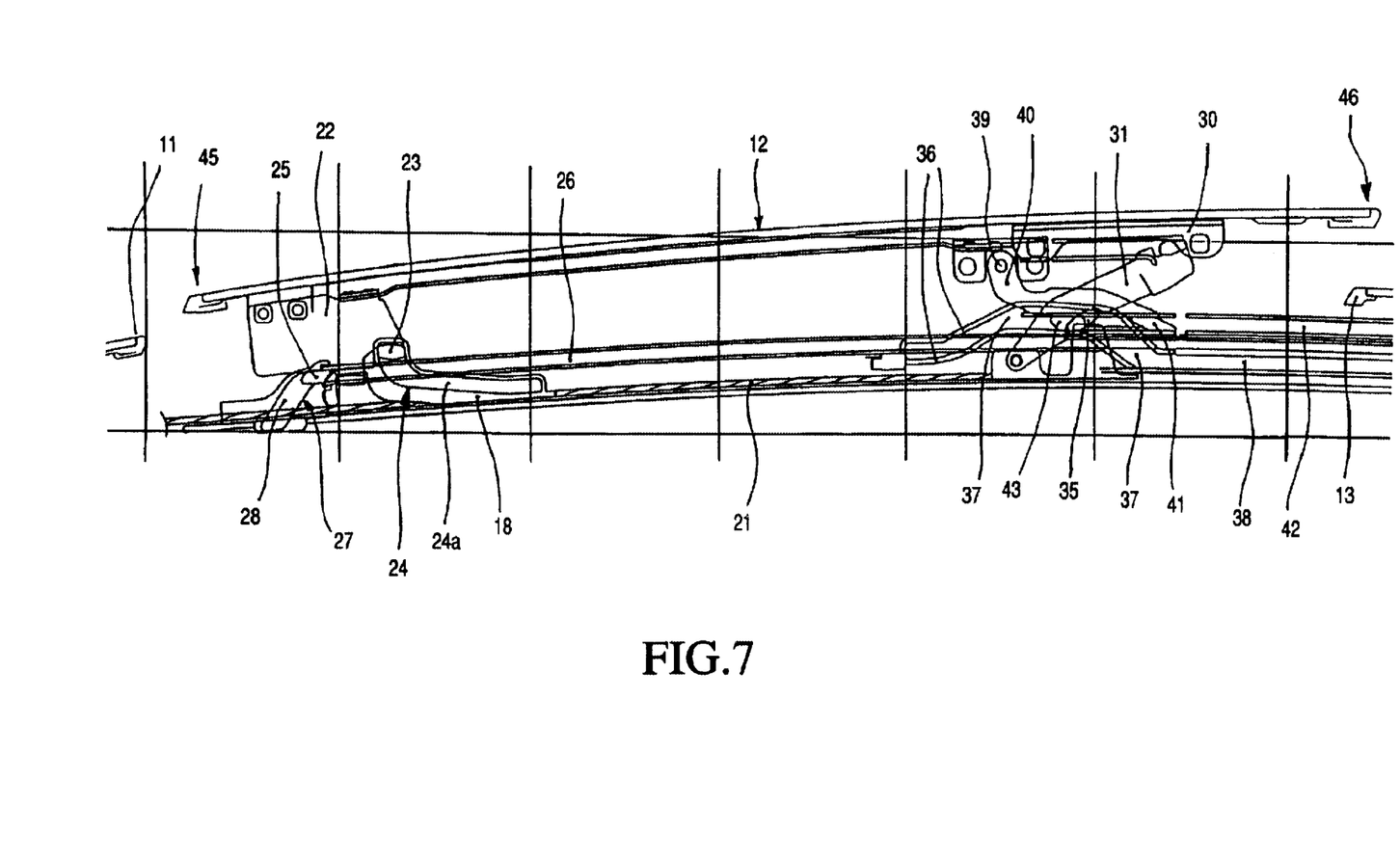
FIG. 7 shows a lengthwise section through the side edge of the motor vehicle roof in the area of the raising mechanism at the end of the transition motion.
Figure 8:
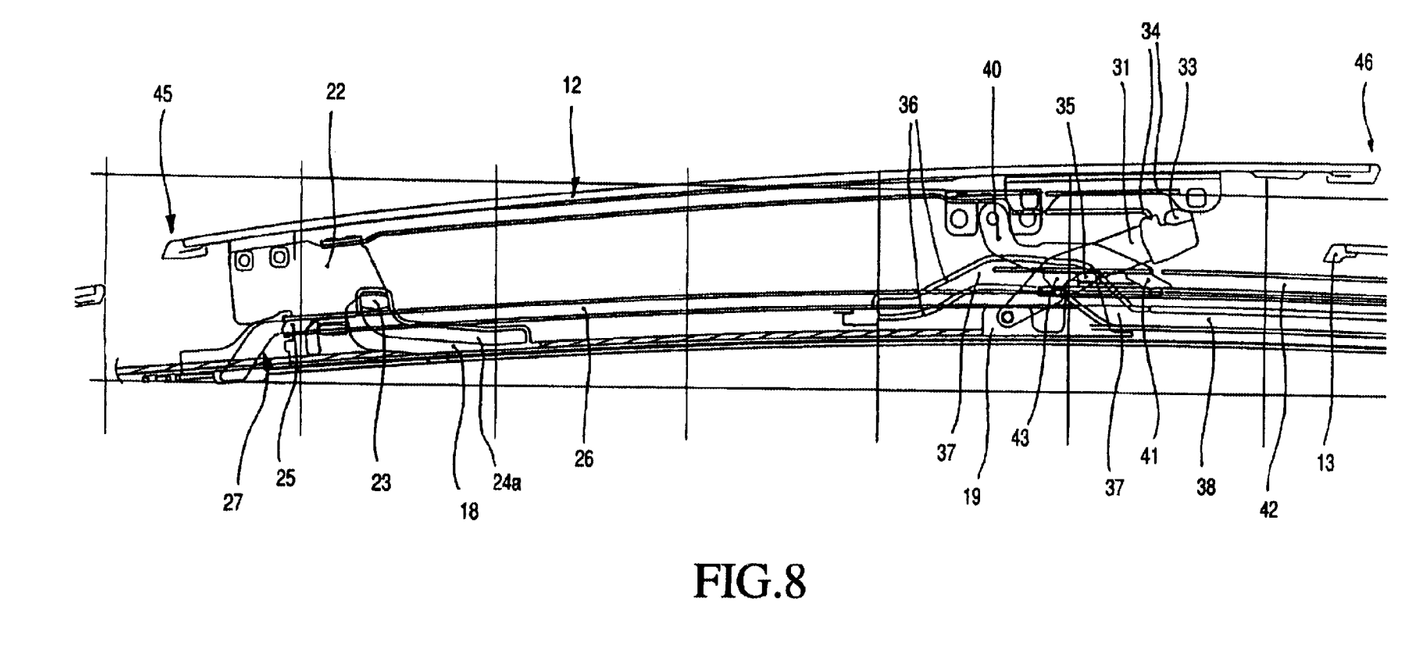
FIG. 8 shows a lengthwise section through the side edge of the motor vehicle roof in the area of the raising mechanism in the intermediate position.
Figure 9:
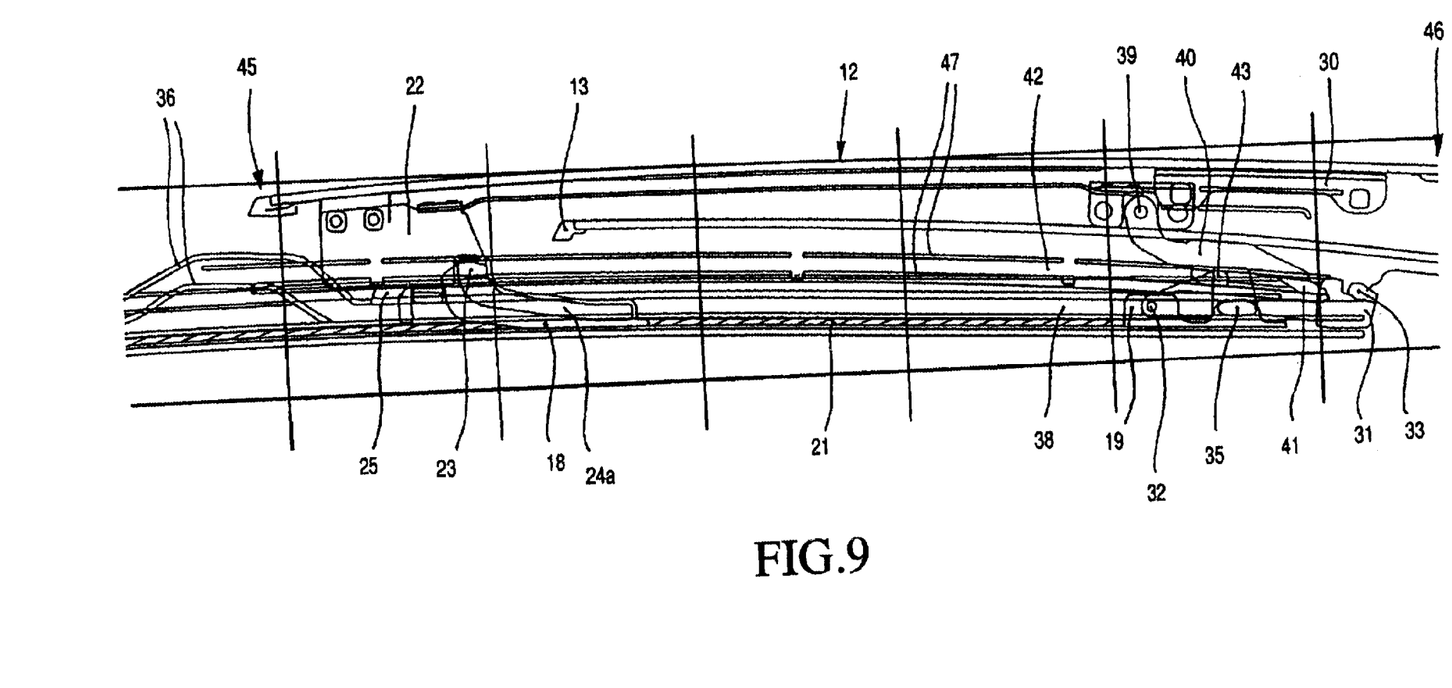
FIG. 9 shows a lengthwise section through the side edge of the motor vehicle roof in the area of the raising mechanism with the cover opened.

On the bottom of the cover 12 in the area of its front edge 45 there is a lateral vertical cover carrier 22. A laterally projecting slip journal 23 is securely attached at a distance from the front edge 45 of the cover 12 to the rear edge of the cover carrier 22. The slip journal 23 fits into a crank path 24a of the lifting crank 24 which is securely attached to the front control carriage 18 or is made in one piece with it. The crank path 24a of the lifting crank 24 runs in an ascending path from its back end to its front end in the area of the front edge 45 of the cover 12. In particular, the crank path 24a is formed in a roughly L-shape with a front, short, bent leg section and a rear, long, bent leg section. When the cover 12 is closed, the slip journal 23, is located in the area of the back end of the crank path 24a (FIG. 3). When the cover 12 is raised forward and during the displacement of the cover 12, the slip journal 23 is located on the front elevated end of the crank path 24a, as shown in FIG. 7. The slip journal 23 moves in the crank path 24a as a result of the lengthwise displacement of the control carriage 18 which is effected by the drive cable 21, the slip journal 23, from its bottom position shown in FIG. 3 with the cover 12 closed, by backwards displacement of the front control carriage 19 reaching its upper position in which the front edge 45 of the cover 12 is raised, as shown in FIG. 7.

A slide journal 25 which is likewise attached to the rear edge of the cover carrier 22 and in the embodiment shown lies in front of the slip journal 23 in the lengthwise direction of the motor vehicle projects laterally from the cover carrier 22. The guide rail 17 furthermore comprises a guideway 26 for the slide journal 25 which runs parallel to the carriage guideway 20 in the lengthwise direction of the guide rail 17. The front end of the slide journal guideway 26 adjoins a crank 27 for guiding the front edge 45 of the cover 12 during its raising and lowering motion. This crank 27 is securely connected to the guide rail 17 and the motor vehicle roof 10 and has a crank path 28 which adjoins the front end of the slide journal guideway 26 of the guide rail 17 and runs down to the front. With the cover 12 closed the slide journal 25 is located on the bottom end of the crank path 28, as shown in FIG. 3. The slide journal 25 is guided largely without play in the lengthwise direction of the motor vehicle (x-direction) and thus determines the exact position of the front edge 45 in the closed position of the cover 12.

Figure 5:
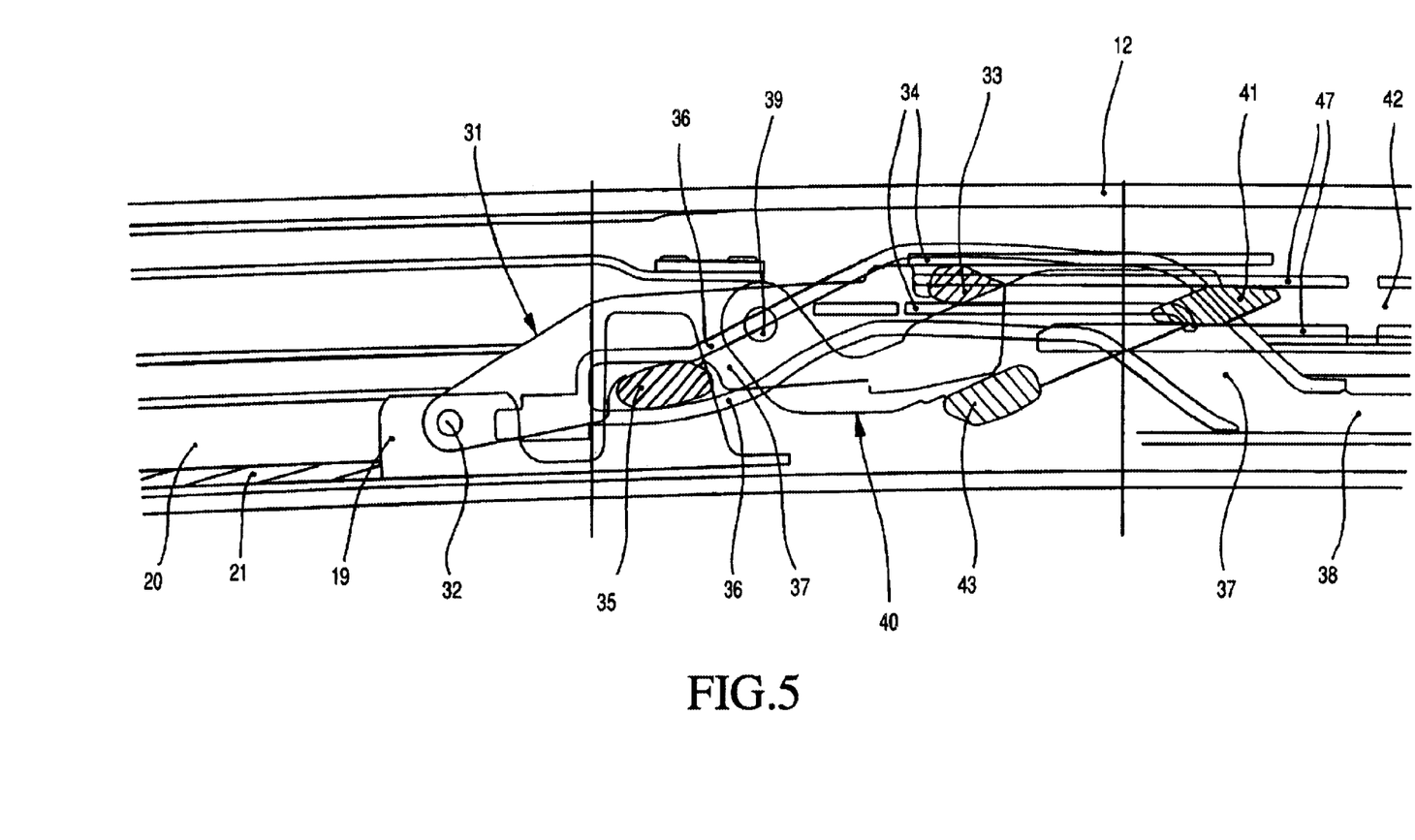
FIG. 5 shows a lengthwise section as shown in FIG. 3 through the rear raising mechanism in an enlarged representation.

The exact position of the front edge 45 in the vertical direction (z direction) is determined by the slip journal 23 which is held essentially without play in the rear segment of the crank path 24a in the vertical direction. When the front edge 45 of the cover 12 is raised by means of the lifting crank 24 and the slip journal 23 by moving the front control carriage 18 to the rear, at the same time the slide journal 25 moves up along the crank path 28, which ascends to the rear, and finally enters the front end of the slide journal guideway 26 of the guide rail 17, as shown in FIG. 5. At this point the cover 12 in the area of its front edge 45 has assumed a position from which it can be pushed to the rear.

The lifting and displacement mechanism in the area of the rear edge 46 of the cover 12 is explained below using the lengthwise displacement of the rear guide carriage 19 via the drive cable 21.

Figure 6:
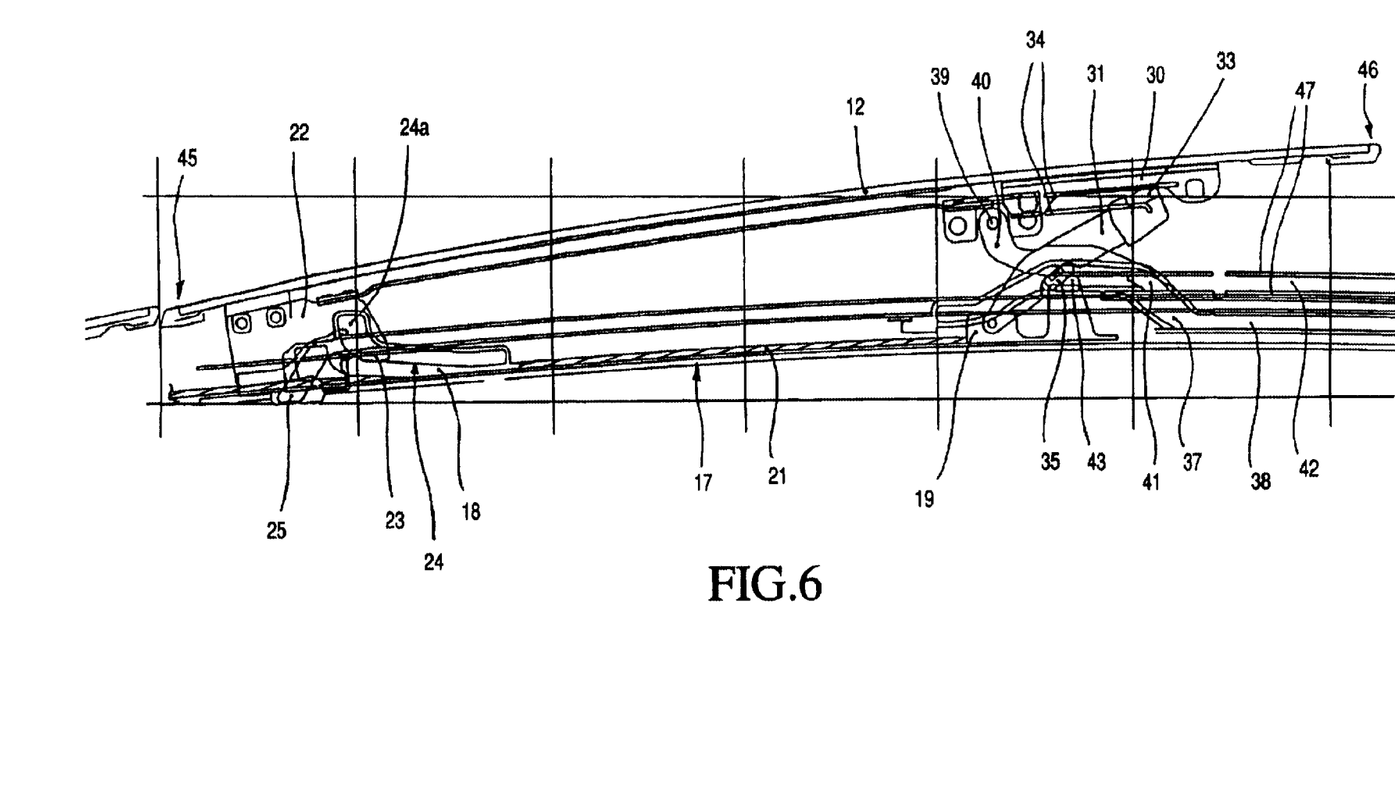
FIG. 6 shows a lengthwise section through the side edge of the motor vehicle roof in the area of the raising mechanism with the cover raised.

The cover 12 in the area of its rear edge 46 has a cover carrier 30 that extends downward, as shown in FIG. 6. To raise the rear edge 46 of the cover 12 a raising lever 31 is used that is pivotally coupled to the rear control carriage 19 on its front end by means of a bearing pin 32 and also pivotally coupled to the rear control carriage 19. The raising lever 31 also has a rear slider 33 on its back end that projects laterally. The rear slider 33, with the cover closed up to the raised cover position, as shown in FIG. 3 or transfer position, as shown in FIG. 5, fits into a cover guide 34 on the cover carrier 30 which is open to the rear. Between the bearing pin 32 and the rear slider 33 a front slider 35 projects laterally from the raising lever 31 and is guided to slide in a lifting crank 36 which is mounted on the guide rail. The crank path 37 of the lifting crank 36 runs from front to back, first ascending, thereupon essentially parallel to the lengthwise direction of the guide rail 17 and then descending and ending in the guideway 38 of the guide rail 17 which can coincide with the crank guideway 20.

By means of the bearing pin 39 a support lever 40 for the rear edge 46 of the cover 12 is coupled to the cover carrier 30. On the end of the support lever 40, opposite the bearing pin 39, is a guide journal 41 that projects laterally from the support lever 40. The guide journal is guided in all positions of the rear edge 46 of the cover 12 in the guide journal path 42 of the guide rail 47 which is outside with respect to the inside guide rail 17 mentioned first. The guide journal path 42 runs in the lengthwise direction of the guide rail 47. Instead of the inner guide rail 17 and the outer guide rail 47 there can also be only one guide rail which contains the indicated guideways.

Roughly in the middle, between the bearing pin 39 and the guide journal 41, a support journal 43 projects laterally from the support lever 40. After the complete raising of the rear edge 46 of the cover 12, the support journal 43 enters the guide journal path 42. As the cover 12 continues to be displaced to the rear, the support journal 43 slides in this guide journal path 42 in order to support the cover 12, which has been swiveled up on the back. As opposed to the raising lever 31, the support journal 43 slides together with the guide journal 41 that is guided in the guide journal path 42.

As is best seen from FIGS. 10 to 12 and 14, there are locking elements, of which one is made as a locking bracket 48 and the other as a locking angle 49. The locking bracket 48 is made on the cover guide 34 as a crosspiece that points down in the forward area.

Figure 10:
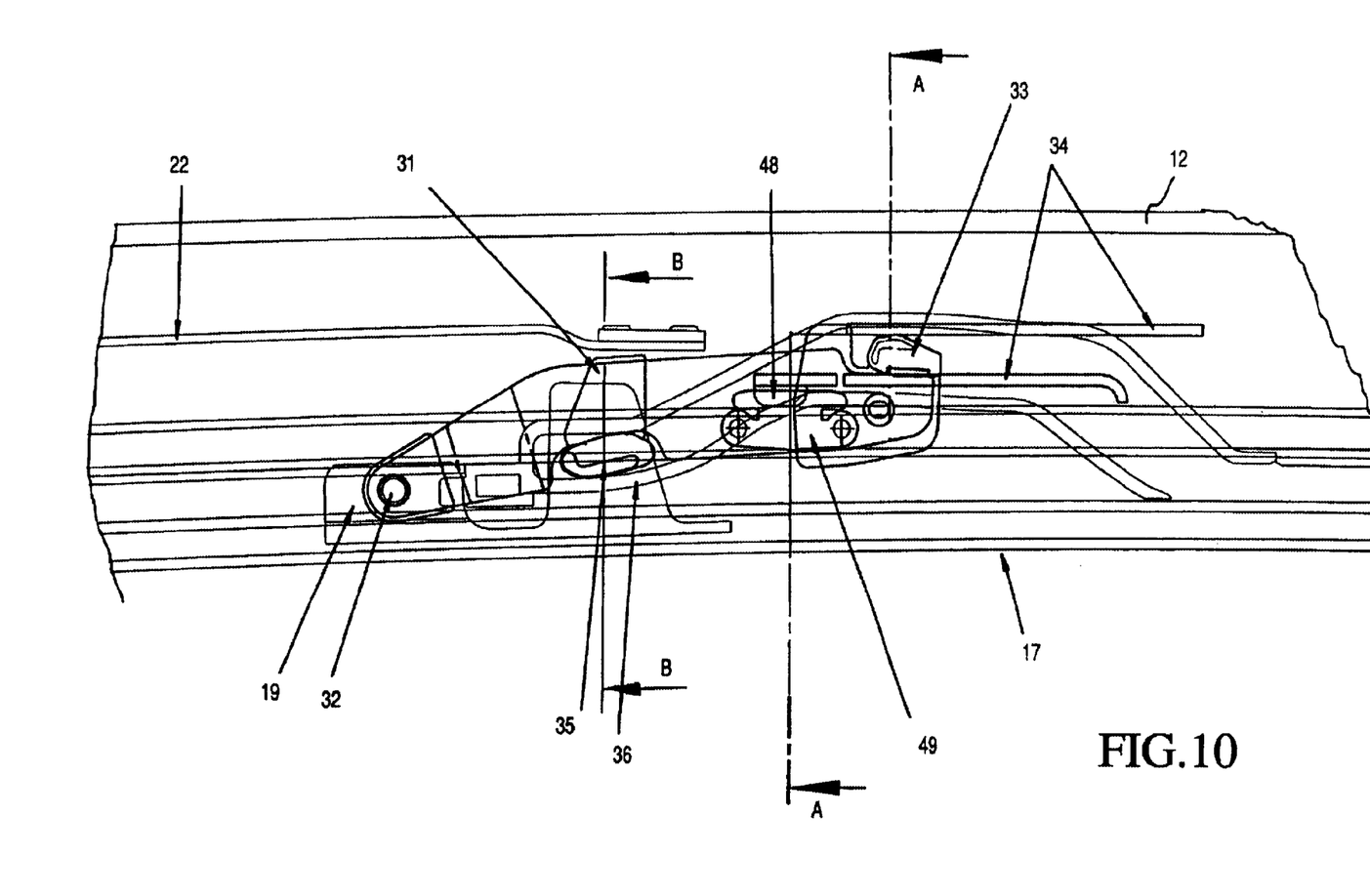
FIG. 10 shows a lengthwise section as shown in FIG. 3 through the rear raising mechanism in the closed position of the cover with the lock engaged.
Figure 11:
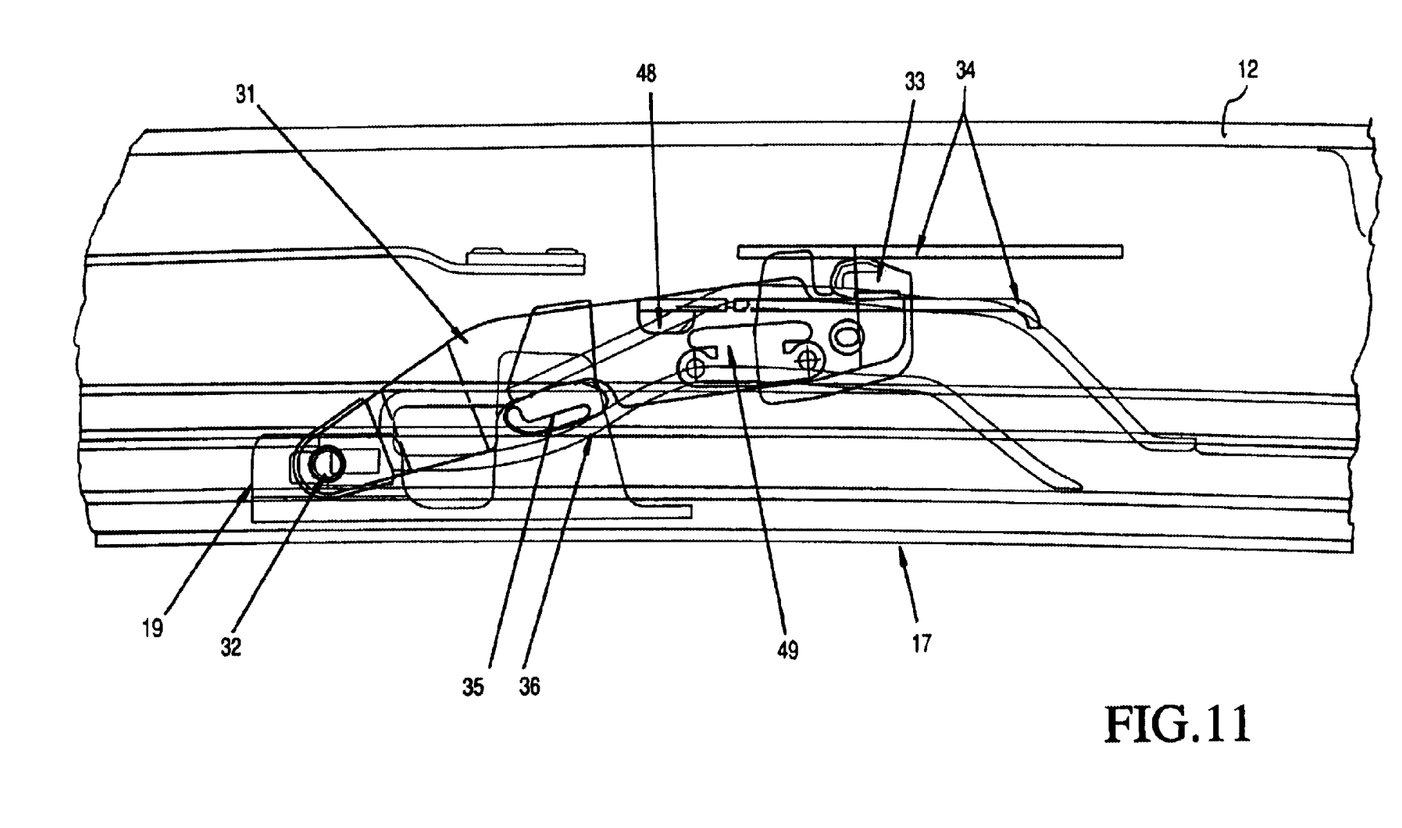
FIG. 11 shows a lengthwise section as shown in FIG. 3 through the rear raising mechanism in the raised intermediate position of the cover with the lock disengaged.

The locking angle 49 conversely projects laterally from the raising lever 31 and encompasses the locking bracket 48 in the closed position of the cover 12, as shown in FIG. 10. By this encompassing of the locking bracket 48 by the locking angle 49 the rear slider 33, even with very strong pressure on the inside of the cover 12, cannot be torn or screwed out of the cover guide 34 around its lengthwise axis. Thus, in the closed position of the cover 12, reliable locking of the cover 12 is ensured via the raising lever 31 with the guide rail 17 and thus with the fixed motor vehicle roof 10. On the other hand, as can be seen from FIG. 11, when raising lever 31 is moved by the rear control carriage 19 to shift the cover from its closed position, the locking angle 49 on the locking lever 31 is disengaged from the locking bracket 48 on the cover guide 34.

Figure 12:
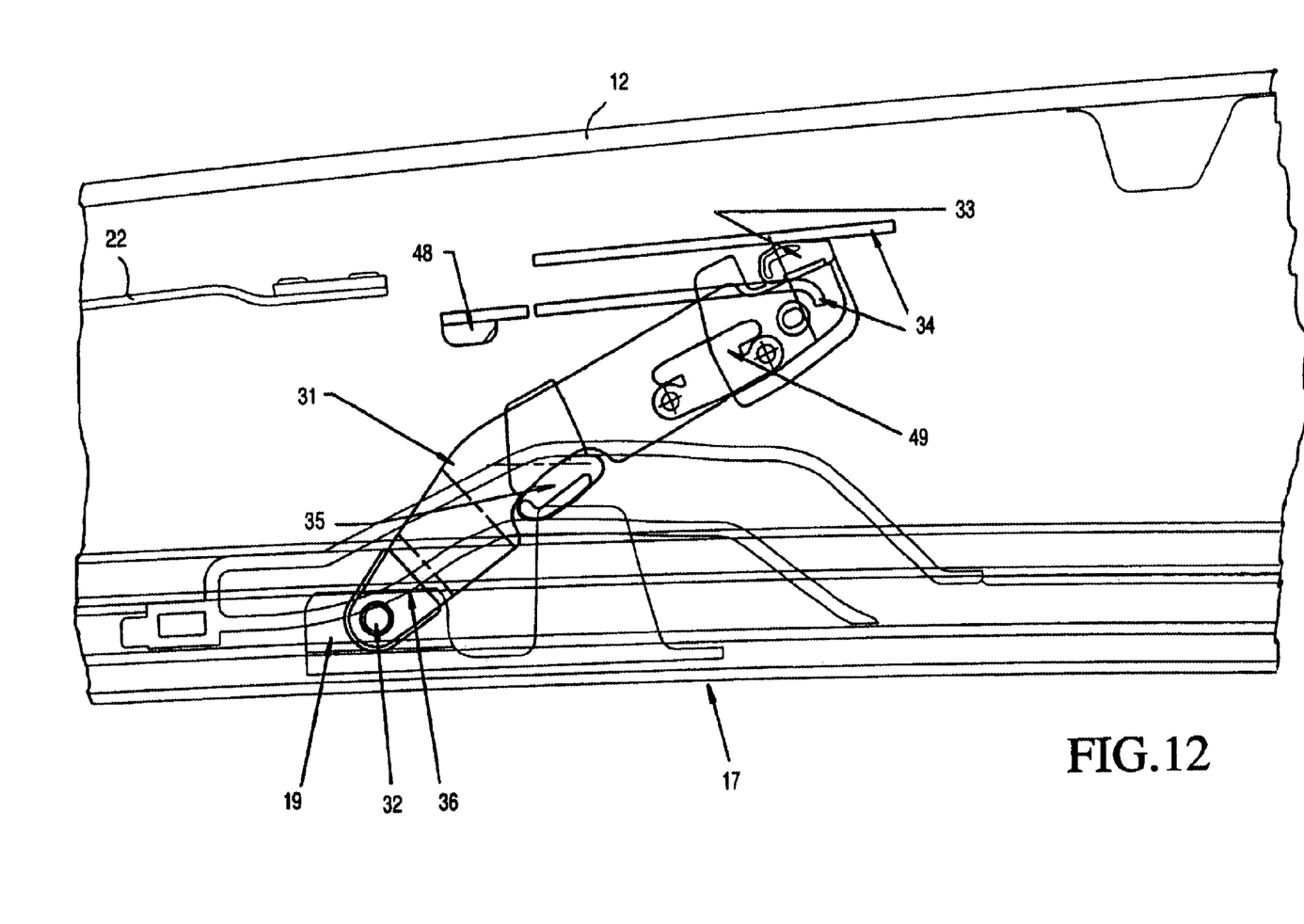
FIG. 12 shows a lengthwise section as shown in FIG. 3 through the rear raising mechanism in the completely raised position of the cover with the lock disengaged.
Figure 13:
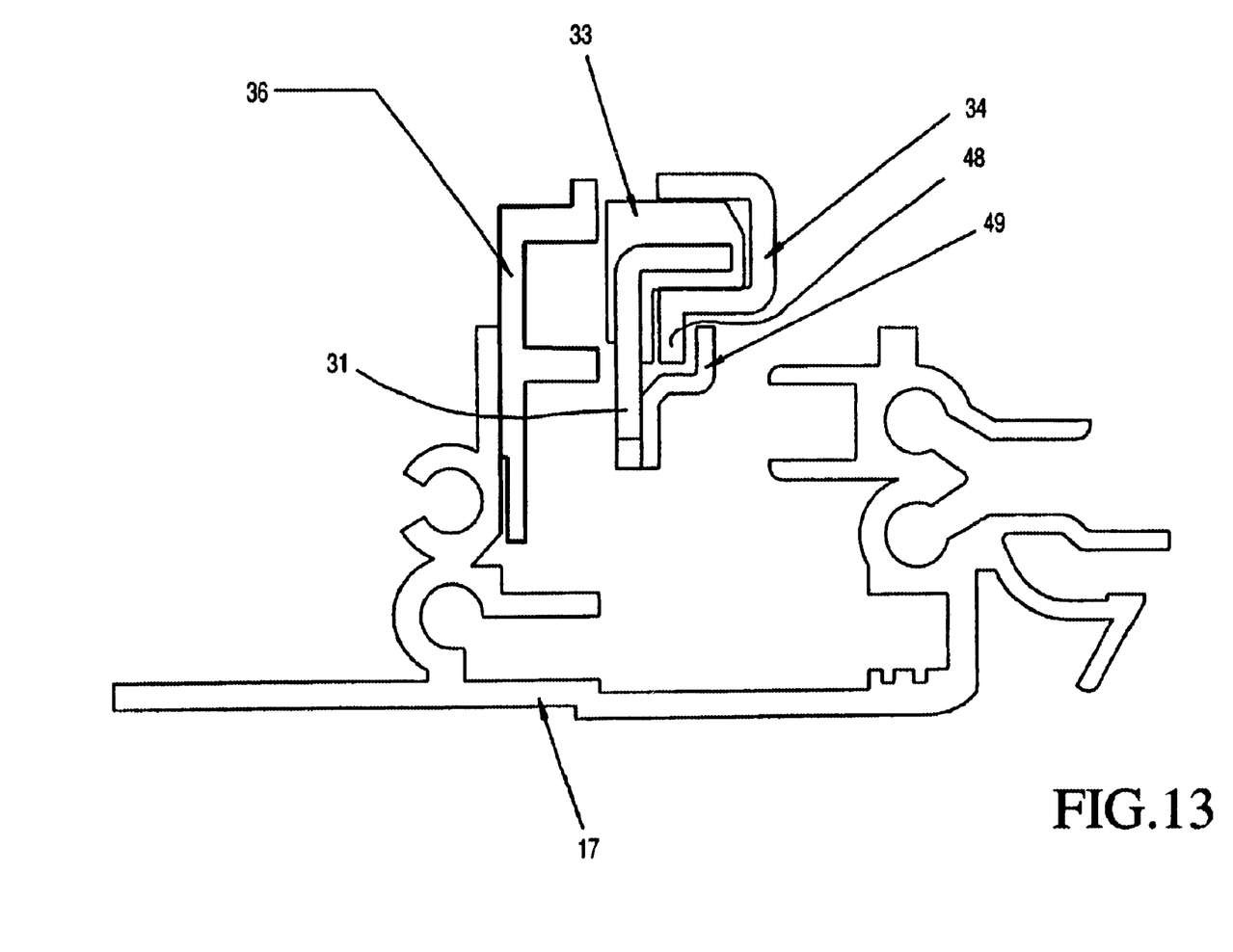
FIG. 13 shows a cross section along line A—A in FIG. 10.
Figure 14:
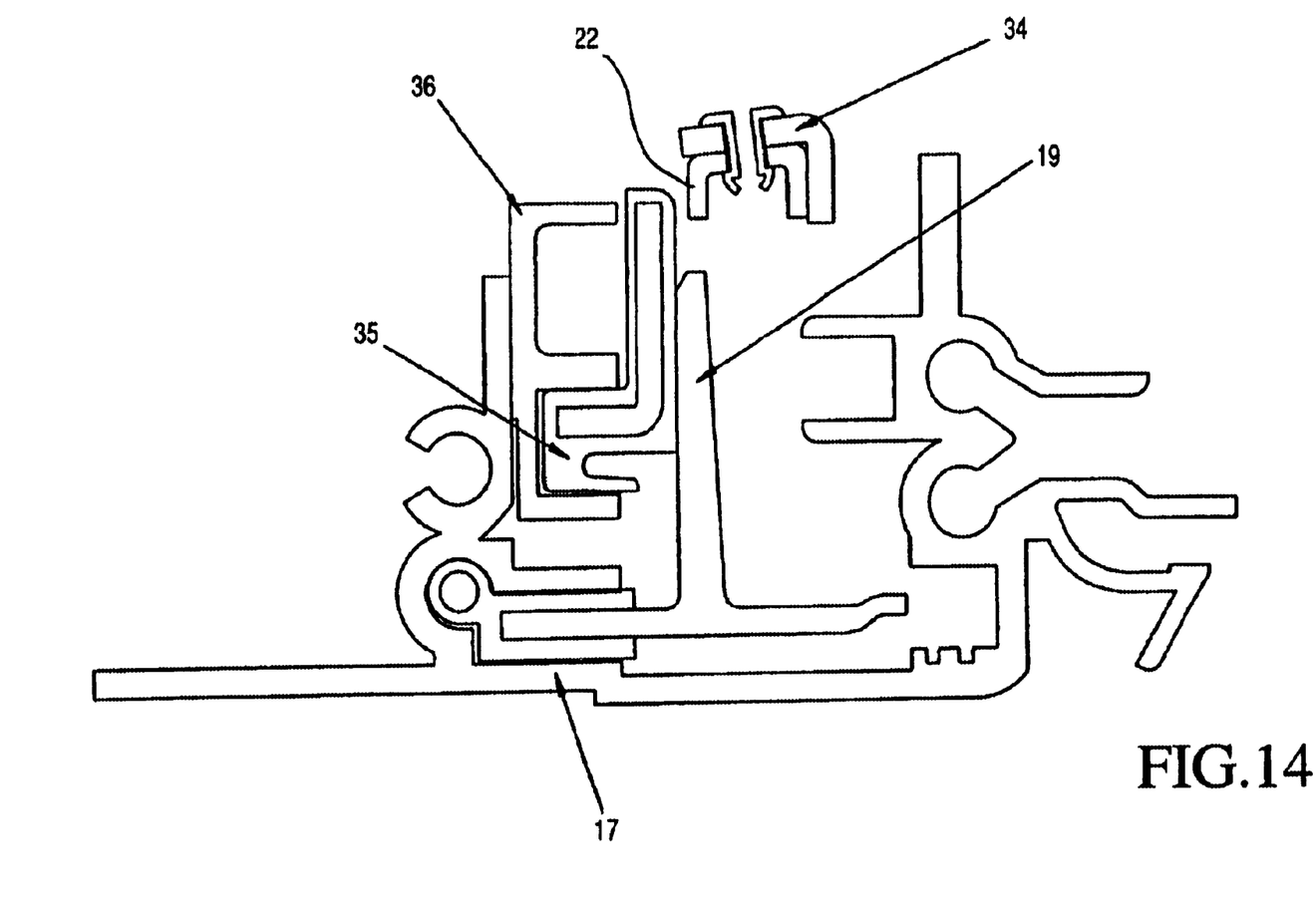
FIG. 14 shows a cross section along line B—B in FIG. 10.

The lifting of the rear edge 46 of the cover 12 into the opening position of the cover, as shown in FIGS. 7 and 12, is explained below using FIGS. 5 to 14.

When the rear control carriage 19 proceeding from the cover in the closed position, as shown in FIG. 5, is moved to the rear by means of the drive cable 21, the front slider 35 of the raising lever 31 first moves upwards in the front ascending segment of the crank path 37 of the lifting crank 36, as shown in FIG. 6. This causes the raising lever 31, which has been swiveled upward by means of the rear slider 33, and which is guided in the cover guide 34, to raise the rear edge 46 of the cover 12 over the fixed roof. In the position shown in FIG. 6, the support journal 43, which has not engaged, enters the guide journal path 42 and then slides in a continued backward motion of the rear control carriage 19, together with the guide journal 41 sliding in front of it along the guide journal path 42, with support of the cover 12 at a given raising angle to the rear. When the rear control carriage 19 is moved from the position shown in FIG. 3 or 5 into the position shown in FIG. 6, in which the rear edge 46 of the cover 12 is raised, the rear slider 33 moves from the front end of the cover guide 34 to its back open end, from which the rear slider 33 emerges with continued backward motion of the rear control carriage 19, as shown in FIG. 7, which shows the transfer position). During the transition from the position shown in FIG. 6 to the position shown in FIG. 7, the front slider 35 moves along the horizontal part of the crank path 37 of the lifting crank 36 and thereupon reaches the descending part of the crank path 37 so that the raising lever 31 is again swiveled downward into a roughly horizontal position.

With continued backward motion of the rear control carriage 19 the front slider 35 enters the guideway 38 which guides the raising lever 31 during continued backward motion of the control carriage 19 in its lowered horizontal position in which it is inoperative. The raised position of the rear edge 46 of the cover 12 is now maintained exclusively by the support lever 40 with two journals 41 and 43 which are guided in the guide journal path 42.

The closing motion of the cover 12 takes place in the common, coupled forward running of the two control carriages 18 and 19 with the reverse sequence of the swiveling motions of the rear edge 46 and the front edge 45 of the cover 12.

What is claimed is:

1. A motor vehicle roof comprising at least one cover and a control mechanism, said control mechanism having a rear lifting and displacement mechanism coupled proximate a rear edge of the cover, wherein said lifting and displacement mechanism further comprises a moveable part, part which is connected to the at least one cover, and at least one control carriage connected to the at least one cover, wherein said moveable part and said part connected to the at least one cover further include locking elements which are engaged in a closed position of the at least one cover and are disengaged upon movement of the at least one cover out of said closed position, wherein said lifting and displacement mechanism is connected to the at least one cover in a manner for moving and raising the rear edge of the at least one cover, wherein said control carriage is movably guided in lateral rails, and wherein engagement of said lock elements counteracts upward ejection of the at least one cover, by a movement of the control carriage and the movable part around lengthwise axes thereof, when the at least one cover is in a closed position.

2. Motor vehicle roof as claimed in claim 1, wherein the movable part of the lifting and displacement mechanism is a raising lever.

3. Motor vehicle roof as claimed in claim 1, wherein the part which is connected to the at least one cover is a cover guide which engages part of the lifting and displacement mechanism and enables relative motion of the lifting and displacement mechanism with respect to the at least one cover upon raising of the rear edge of the at least one cover.

4. Motor vehicle roof as claimed in claim 2, wherein the part which is connected to the at least one cover is a cover guide which engages part of the lifting and displacement mechanism and enables relative motion of the lifting and displacement mechanism with respect to the at least one cover upon raising of the rear edge of the at least one cover.

5. Motor vehicle roof as claimed in claim 1, wherein the locking element on the part which is connected to the at least one cover is a downwardly bent locking bracket.

6. Motor vehicle roof as claimed in claim 2, wherein the locking element on the part which is connected to the at least one cover is a downward bent locking bracket.

7. Motor vehicle roof as claimed in claim 3, wherein the locking element on the part which is connected to the cover is a downwardly bent locking bracket.

8. Motor vehicle roof as claimed in claim 4, wherein the locking element on the part which is connected to the cover is a downwardly bent locking bracket.

9. Motor vehicle roof as claimed in claim 8, wherein the locking element on the movable part of the lifting and displacement mechanism is a laterally and upwardly projecting locking angle which encompasses the locking bracket in the closed position of the at least one cover.

10. Motor vehicle roof as claimed in claim 9, wherein the cover is movable to the rear and above a fixed motor vehicle roof.

11. Motor vehicle roof as claimed in claim 1, wherein the movable part of the lifting and displacement mechanism comprises a raising lever pivotally coupled to a rear control carriage, wherein a roof-mounted lifting crank is provided which is adapted to raise the raising lever during backward motion of the rear control carriage for raising the rear edge of the cover, and wherein the locking elements are adapted to be disengaged by said raising of the raising lever.

12. A motor vehicle roof as claimed in claim 11, further comprising a separate support lever; wherein, after disengaging of the locking elements, the raising lever is adapted to disengage from the cover in manner transferring support of the rear edge of the cover to the separate support lever.

13. Motor vehicle roof as claimed in claim 11, wherein the locking elements comprise a first locking element extending downward from said roof-mounted lifting crank and a second locking element extending laterally from said raising lever.

14. Motor vehicle roof as claimed in claim 11, wherein the locking elements comprise interlocking brackets.

15. Motor vehicle roof as claimed in claim 14, wherein the interlocking brackets comprise a locking angle on said part connected to the at least one cover and a locking bracket on said movable part.

16. Motor vehicle roof as claimed in claim 1, wherein the movable part of the lifting and displacement mechanism is a raising lever and the part connected to the at least one cover is a cover guide which engages part of the raising lever and enables relative motion of the raising lever with respect to the at least one cover during raising of the rear edge of the at least one cover.

* * * * *